8989½X
W. A. HERRICK.
CHURN.
Patented July 21, 1835.
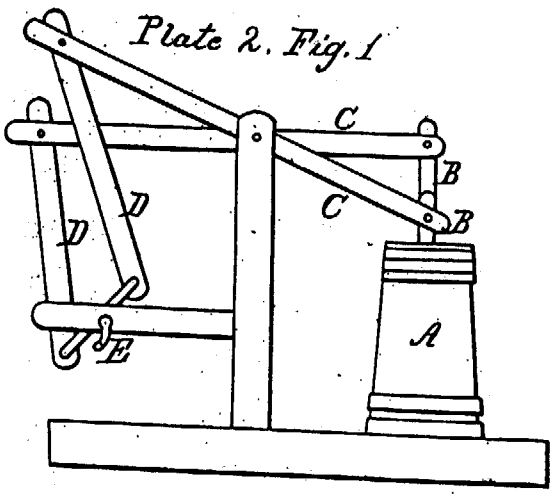
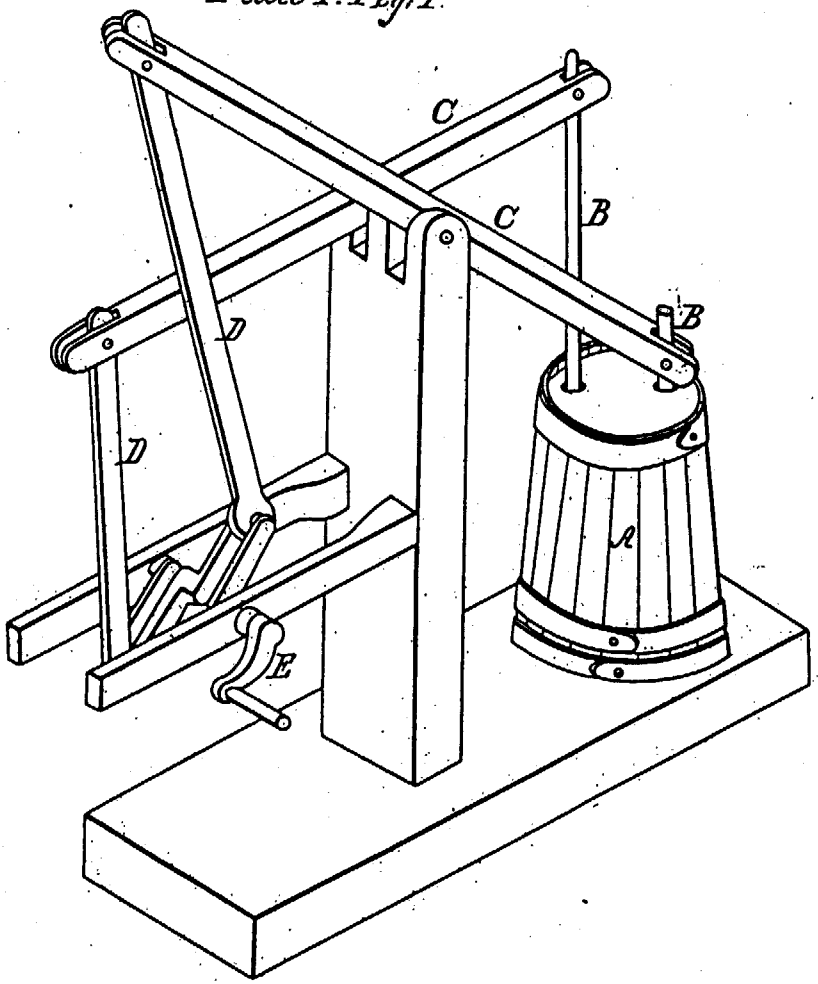
THE NORRIS PETERS CO., PHOTO-LITHO., WASHINGTON, D. C.

8989½X July 21 1835 [illegible]

William A. Herrick of Greene in the State of Maine

Letters Patent -

The schedule referred to in these Letters Patent and making part of the same, containing a description in the words of the said William A. Herrick himself of his improvement in the common Churn. To all to whom these presents shall come Be it known that I William A. Herrick of Greene in the county of Kennebec and State of Maine, have invented a new and useful improvement in the common Churn, and that the following is a full and exact description of the construction & operation of the said machine as invented or improved by me reference being had to the accompanying plates viz. - Plate I, fig 1. represents a view of my said Churn in operation. A, is the churn firmly fixed to a platform. B. B. are two dasher rods, the dashers being made in the form of a cross, with one side of the cross cut off so as to allow the two to come nearer in contact. There may be one or more dashers affixed to a rod. C. C. are two levers or arms fixed on an axle in the top of a firm upright post, these levers may be hung equally in the middle or nearer to one or other end so as to increase or diminish the lever power. D. D. are two sweeps fixed into the ends of the levers which descend and are attached to a double crank, E. is the crank, by which the whole is operated Plate II fig 1. is a linear view of the same, [illegible] - What I specifically claim & for which I ask an exclusive right is the arrangement of cranks and levers for the working or operating two or more dashers for the purpose of churning as above specified. In testimony that the above is a true specification of my said improvement as above described, I have hereunto set my hand this sixth day of May 1835, Witnesses { Elias Adams
{ Isaac N. Thomas Wm. A. Herrick (41 words) (Drawing)